United States Patent [19]

Partridge et al.

[11] 4,318,134
[45] Mar. 2, 1982

[54] RECORDING GRAPHIC DATA OF DIFFERENT TRANSMISSION RATES

[75] Inventors: Malcolm F. Partridge, Braintree; Frederick W. Simpkins, Hudson; Lawrence A. Farrington, Natick, all of Mass.

[73] Assignee: Alden Research Foundation, Westboro, Mass.

[21] Appl. No.: 11,146

[22] Filed: Feb. 12, 1979

[51] Int. Cl.³ .............................................. H04N 1/04
[52] U.S. Cl. .................................... 358/287; 358/267; 358/296; 358/284
[58] Field of Search ............... 358/267, 280, 284, 287, 358/77, 78, 269, 296

[56] References Cited

U.S. PATENT DOCUMENTS

| | | | |
|---|---|---|---|
| 4,000,371 | 12/1976 | Ogawa | 358/257 |
| 4,075,663 | 2/1978 | Wellendorf | 358/287 |
| 4,079,425 | 3/1978 | Vandling | 358/257 |
| 4,090,222 | 5/1978 | Nakagome et al. | 358/288 |

OTHER PUBLICATIONS

F. T. Horlander, "Incremental Scanning for Facsimile", IBM Technical Disclosure, vol. 14, No. 11, 4-72.

Primary Examiner—Jin F. Ng
Assistant Examiner—Edward L. Coles
Attorney, Agent, or Firm—James H. Grover

[57] ABSTRACT

Facsimile apparatus for line by line recording of different kinds of weather map, satellite and other graphic data distinguishes the different characteristics of the transmitted electrical data signals and records them in suitable aspect ratio, despite the fact that the various signals are transmitted at different line rates and are intended for recording at different line densities. The apparatus also enhances the contrast of the recording and can enlarge the original graphic information.

16 Claims, 9 Drawing Figures

RECORDING GRAPHIC DATA OF DIFFERENT TRANSMISSION RATES

BACKGROUND OF THE INVENTION

In the facsimile transmission and recording of weather maps alone there are, internationally, a diversity of signal sources and transmission modes. The density of the line by line scanning at the signal source may be 48 or 96 lines per inch (LPI) corresponding to a standard known as Index of Cooperation (IOC) of 288 and 576, where:

$$IOC = \frac{\text{Line Length} \times LPI}{pi}$$

The time rate of line by line scanning may be 60, 90, 120, 180 or 240 sweeps per minute (SPM). Thus the two line densities and five scan rates impose on the recorder the burden of adjusting to ten different combinations of transmission modes. Additional adjustments are desirable to maintain clear contrast between light and dark portions of the recorded data. Also in some cases it is desirable to extract a portion of the transmitted frame of graphic information and effectively enlarge the portion by recording on an area normally occupied by the whole frame, while maintaining the same aspect ratio as in the normal frame, and maintaining or enhancing the contrast of the enlarged portion.

While all the above mentioned adjustments and compensations can be made piecemeal by separate adjustments of the recorder scanning rate (SPM), the line density and contrast (LPI), it is the object of the present invention to make the adjustments largely automatically in response to the incoming signal so that the recorder does not require constant operator attendance.

SUMMARY OF THE INVENTION

According to the invention apparatus for recording different kinds of transmitted electrical signals on a moving web of predetermined width, each signal comprising a plurality of lines of information and constituting a frame of graphic information including a distinct characteristic identifying a suitable aspect ratio of the frame, different kinds of signals comprising lines occurring at different line rates, the apparatus comprises means for receipt of the signals at their transmitted line rate and storage of the signals; scan means coupled to the storage means and responsive to signals read out of the storage means to record successive lines on the web at a scan rate equal to or greater than the line rate; feed means for advancing the web relative to the scan means at one of a plurality of speeds; and means for selecting the web feed speed dependent on the distinctive characteristic of the signal whereby signal groups of different line rates are recorded each in a suitable aspect ratio.

Further according to the invention the apparatus includes means responsive to line rate signals lower than the scan rate to cause readout of each stored line a plurality of times.

Still further according to the invention the apparatus includes means to control the rate of signal storage during each line scan.

DESCRIPTION OF THE PREFERRED EMBODIMENT

The present recording apparatus is capable of recording various types of electrical signals such as those derived from facsimile and weather map scanners, satellite transmissions, radar and sonar scanners, and in general, information which is represented graphically line by line within a frame which has a particular ratio of width to height, i.e. aspect ratio. The aspect ratio is usually fixed but may be recorded somewhat altered so that a suitable aspect ratio may be identical or substantially identical to the ratio of the original graphic information.

Recording the transmitted graphic information in suitable aspect ratio is complicated by the large diversity of transmission modes. The remote scanner may transmit signals at a scan rate of 60, 90, 120, 180 or 240 line scans or sweeps per minute (SPM) in the various weather map transmissions, or at 120 SPM for the TIROS-N satellite, for example. The line density in land line transmissions may be either 48 or 96 lines per inch (LPI). From Tiros-N the line density will be 110 LPI. See also Table I.

Figure 1:
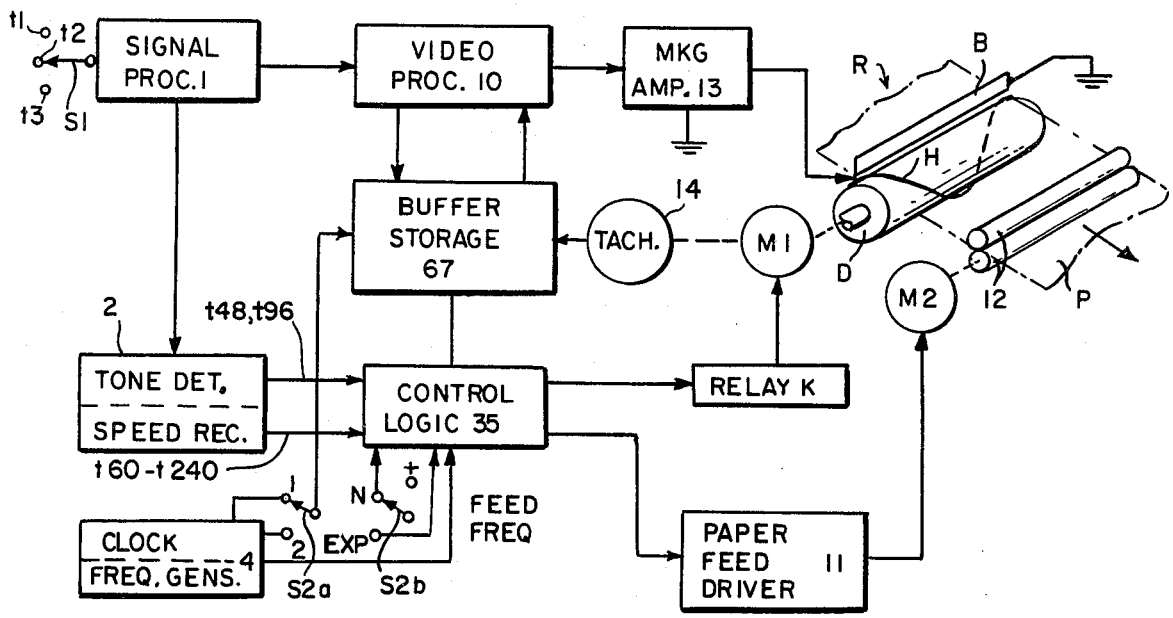
FIG. 1 is a system diagram of a facsimile recorder, according to the invention, including a control logic circuit.
Figure 2:
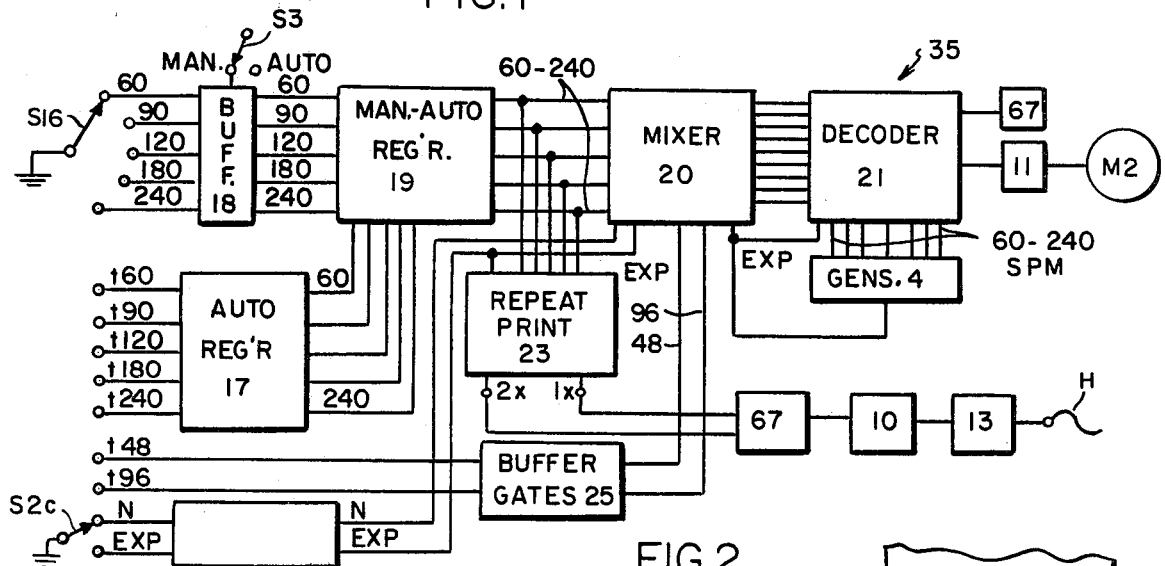
FIG. 2 is a schematic diagram of the control logic circuit of FIG. 1.

Apparatus for recording such different kinds of transmitted signals is shown in FIGS. 1 and 2. The major components and functions of the recording apparatus are described under the following captions:

Signal Processor 1
Tone Detection and Speed Recognition 2
Video Processor 10
Buffer Storage 67
Recorder R
Clock and Paper Feed Frequency Generator 4
Control Logic 35
Aspect Ratio
Repeat Print
Expansion

SIGNAL PROCESSOR

Input terminals t1, t2 and t3 respectively carry signals from a land line, or from broadcast or satellite receivers. A front panel switch S1 selects the signal to be recorded and applies it to a signal processor 1. The signal processor 1 typically demodulates an AM signal producing a video signal applied to a video processor 10, and various control tones which are applied to a tone detection and speed recognition circuit 2.

TONE DETECTOR AND SPEED RECOGNITION 2

As is well known in the art, facsimile signals used for weather map and satellite transmission are composed of an initial period (e.g. 3 to 5 seconds) of start-tone modulation at 300 or 675 HZ corresponding to line densities of 96 or 48 LPI, followed by a period (e.g. 5 to 30 seconds) of pulsed signals normally used to synchronize and frame the recorder scanner with the transmitter scanner. The pulses of the synchronizing signals are counted for a period of time to determine their repetition rate which corresponds to the transmitted line scan rate as follows (see also Table I):

| Rep. Rate Hertz | Line Rate SPM |
| --- | --- |
| 1.0 | 60 |
| 1.5 | 90 |
| 2.0 | 120 |
| 3.0 | 180 |
| 4.0 | 240 |

The output of the tone detection and speed recognition circuits 2 are logic signals (i.e. on/off or high/low voltages) at terminals t60 to t240, t48 and t96, which terminals are connected to a control logic circuit 3.

VIDEO PROCESSOR 10

The video processor 10 performs well known functions of shaping and removing transients from the amplitude modulated video signals carrying the graphic information and provides a clean base band signal suitable for digitizing and storage line by line in digital form in a buffer storage 67. The processor also reconverts the stored signal from digital to analog form as each line of video signal is read out of the buffer storage to a recorder R.

BUFFER STORAGE 67

Under the control of a logic circuit 35, as will be more fully described hereinafter, the AM video signals are read into and stored in digital groups line by line in an input memory which alternately is read out to one of two secondary memories. On command of the control logic 35 the stored signals are then read out from one or the other of the secondary memories, either in digital or analog form, to the facsimile recorder R.

The three memories are substantially identical registers having 4096 addresses each capable of storing a four bit digital group. Normally the transmitted signals are read into storage at their transmitted line rate, but if only half of each line is to be recorded the half line is written in at twice standard line rate so as to occupy a full line in the memory, and so that, when read to the recorder out at standard rate the half line will be expanded to occupy the graphic width of a full line.

RECORDER R

The video signals are suitably increased in power by a marking amplifier 13 and applied through moist electrolytic recording paper P or web between a blade electrode B and a helical electrode H curved around a drum D. The helix drum D is driven by a motor M1 according to the present invention at a constant speed of scans per minute equal to or greater than the line rate (SPM) of the transmitted signal. That is, whether the line rate of the transmitted signal is 60, 90, 120, 180, 240 or other sweeps per minute, the helix rotates and the recorder R marks these signals line-by-line on the paper P at 240 SPM, a rate independent of the transmitted line rate.

The helix drum motor M1 also drives a tachometer 14 which acts as a clock in that it generates a timing signal applied to the buffer storage which is a multiple (e.g. 1800) of the helix drum rotation and which controls the read out rate of each line for recording so that read out is synchronized with helix drum rotation.

The recording paper P is drawn past the helix and blade electrodes by a stepping motor M2 at a speed in inches per minute (IPM) controlled by a driver 11 and selected by the control logic circuit 3 from the frequencies supplied by the generators of clock circuit 4.

CLOCK AND PAPER FEED FREQUENCY GENERATOR 4

The clock circuit has two portions: a crystal controlled clock which generates the frequencies at which signals are read from the video processor 10 into the buffer storage 67; and a paper feed frequency generator which generates the frequencies at which the paper feed motor M2 is stepped.

The storage input clock includes two crystal oscillators of 3.6864 MHz and 4.1472 MHz which are divided conventionally down to clock frequencies corresponding to line scan rates as follows (see also Table I):

| Scan Rate SPM | Clock Freq. KHz |
| --- | --- |
| 48 | 2.88 |
| 60 | 3.6 |
| 90 | 5.4 |
| 96 | 5.76 |
| 120 | 7.2 |
| 180 | 10.8 |
| 240 | 14.4 |

As will be explained under the caption Control Logic 35—Expansion a clock signal of a frequency corresponding to the appropriate scan rate is selected by the logic circuit 35 and used to control the rate at which an incoming video signal is clocked from the video processor 10 into the buffer storage 67. In addition the clock provides clock signals of twice each of these frequencies. A first section S2a of a front panel ganged switch permits selection of the normal (1) or doubled (2) clock frequency. The other section S2b notifies the logic circuit 3 that the graphic data is to be recorded at normal size (position N corresponding to position 1 of S2a) or expanded or enlarged (EXP, corresponding to position 2 of S2a).

CONTROL LOGIC 35—ASPECT RATIO

As shown in FIG. 2, the control logic circuit 35 has logic signal inputs at t48 and t96 from the tone detection portion of circuit 2, and at terminals t60-t240 from the speed recognition section. Whichever one of the lines t60 to 240 carries a logical high or ON voltage is entered automatically in a register 17 such as a type SN74174N hex data flip-flop integrated circuit (IC). For example, a land line transmission at 120 SPM scan rate would be entered by registry at a corresponding register address activating the corresponding 120 register output. If a front panel manual/automatic (MAN-/AUTO) selector switch S3 is in AUTO position the registered scan rate is passed to a Manual/Automatic register 19 such as a IC type SN7432N quad 2 input OR gate.

Alternatively the 120 SPM selection can be made by a manual switch S16 and passed through an IC type SN7402N quad 2 input NOR gate to the MAN/AUTO register 19 if the front panel switch S3 is in the MAN position. The register 19 when suitably clocked passes the registered scan rate (e.g. 120) to a mixer 20 comprising two IC type SN74148N priority encoders, 8-line to 3-line fed through two quad 2-input NAND gates.

The mixer also receives a normal or expanded recording logic signal depending on whether the manual switch S2b is in N or EXP position.

Further the mixer receives a logic signal that the incoming data signal was transmitted at 48 or 96 LPI, the data signal passing through buffer gates 25 including an IC type SN7474N dual-D positive edge triggered flip-flop. The mixer combines the scan rate and line density information and transmits logic signals corresponding to the various combinations of scan rate (SPM) and line densities (LPI), and also the expanded (EXP) printing mode to a decoder 21. The decoder 21 is, for example, a type SN74150N 16 bit data selector which primarily selects one of the paper feed speeds from the frequency generators 4 according to the following Table I.

TABLE I

| | Scan Rate SPM | Line Dens'y LPI | Clock Freq. KHz | Start Tone Hz | Pulse Rep. Rate Hz | Paper Feed IPM | Print Times X |
|---|---|---|---|---|---|---|---|
| Land Line | | 48 | 2.88 | 675 | | | |
| | 60 | 48 | 3.6 | 675 | 1 | 1.25 | 2X |
| | 90 | 48 | 5.4 | 675 | 1.5 | 1.87 | 2X |
| | 120 | 48 | 7.2 | 675 | 2 | 2.5 | 2X |
| | 180 | 48 | 10.8 | 675 | 3 | 3.75 | 1X |
| | 240 | 48 | 14.4 | 675 | 4 | 5 | 1X |
| | | 96 | 5.76 | 300 | | | |
| | 60 | 96 | 3.6 | 300 | 1 | .625 | 2X |
| | 90 | 96 | 5.4 | 300 | 1.5 | .937 | 2X |
| | 120 | 96 | 7.2 | 300 | 2 | 1.25 | 2X |
| | 180 | 96 | 10.8 | 300 | 3 | 1.87 | 1X |
| | 240 | 96 | 14.4 | 300 | 4 | 2.5 | 1X |
| Tiros Both | 120 | 110 | 7.2 | | 2 | 1.09 | 2X |
| Exp. | 120 | (55) | 14.4 | | 2 | 2.18 | 2X |

For example, if at the beginning of transmission an incoming signal comprises synchronizing signals of 1 hertz frequency characteristic of a 60 SPM line rate and a 675 hertz start-tone characteristic of a 48 LPI line density the following circuit components will be involved. The tone detector of stage 2 detects the line density of 48 LPI and applies a corresponding logic signal to terminal t48 and through the buffer gates 25 to the mixer 20. Simultaneously the speed recognition section of stage 2 sets the 60 SPM scan rate through terminal t60 to the automatic register 17, and thence through the MAN/AUTO register to the mixer 20. The decoder and frequency generators 4 will then drive the paper feed motor M2, through the driver 11 at 1.25 inches per minute (IPM) automatically selected as described above. This paper feed rate results in a vertical dimension of the graphically recorded frame information which is in the same ratio to the horizontal width of an eighteen inch recorded line as the aspect ratio of the transmitted original information. Similarly with any transmission at a scan rate of 90, 120, 180 or 240 SPM and line density of 48 or 96 LPI, the present logic circuit detects the corresponding signal characteristics of the line density and scan rate which define the aspect ratio of the original information transmitted and automatically causes the motor M2 of recorder R to feed the paper at a speed which combines with the fixed scanned line length, e.g. 18 inches, to reproduce the information in the same aspect ratio or one so nearly the same as to be suitable.

CONTROL LOGIC 35—REPEAT PRINT

In addition to maintaining a suitable aspect ratio as described above the present apparatus also automatically enhances the contrast of recorded graphic signals received at the lower scan rates of 60, 90 and 120 SPM. In the present apparatus the recording helix runs at a constant speed (e.g. 240 RPM), a multiple of the lower scan rates. That is, the helix will scan across the recording paper from 2 to 4 times for each transmitted scan line. Further according to the present invention the control logic of FIG. 2 automatically causes each stored information line to be read out of the buffer storage two or more times in response to receipt of signals transmitted at a line rate which is a submultiple or less of the recorder scan rate (e.g. 120 SPM is ½ of 240 RPM).

The circuits involved in repeat printing are as follows. One of the scan rates 60 to 240 SPM applied to the corresponding terminal (t60, e.g.) of the automatic register 17 and transmits a corresponding logic signal through the register 19 to a Repeat Print stage 23. Stage 23 comprises sets of gates. The first set responds to a logic signal on any of lines 180 or 240 to energize an output 1X to the buffer storage 67 which signals the buffer storage to read out the stored line one time. The second set of gates responds to a logic signal on one of the lines 60, 90 or 120 to actuate a counter connected to the buffer storage by a line 2X to cause the stored line to be read out two times.

Figures 3, 4, 5, 6:
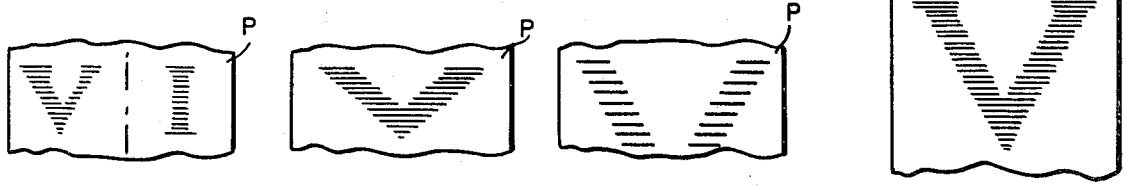
FIGS. 3 to 6 illustrate various corrected and uncorrected facsimile recordings.
Figure 7:
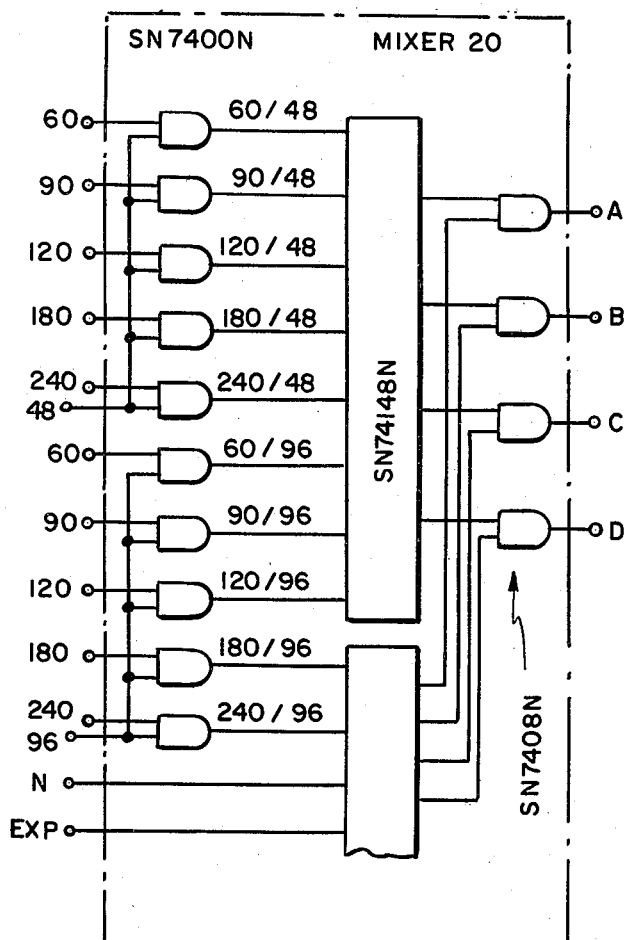
FIGS. 7 to 9 schematically show mixer, decoder and repeat print portions of the control logic circuit.
Figure 8:
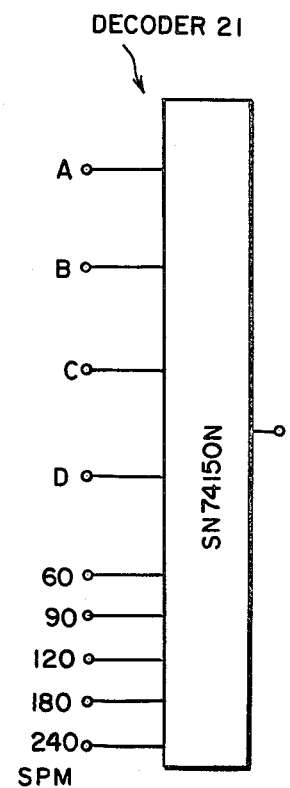
Figure 9:
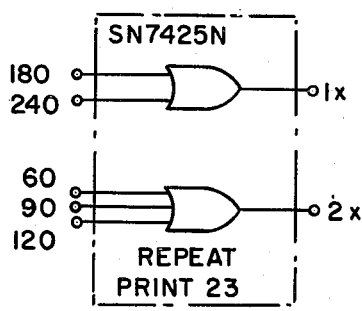

The effect of repeat printing is illustrated by comparison of FIGS. 5 and 6 which are explained more fully under the caption Control Logic 35—Expansion. In FIG. 5 the letter V is printed with a line density of 55 LPI, one line for each transmitted line and appears pale and in low contrast difficult to photocopy. In FIG. 6 the letter V is the same recorded size as in FIG. 5 but repeat printing of each line effectively increases the line density to 110 lines per inch and the image is better defined for reading and contrast for photocopying is enhanced.

CONTROL LOGIC 35—EXPANSION

Proposed transmission from the Tiros-N satellite will include visible light and infrared scanned weather maps side by side in the transmitted frame. That is, one half of each scan line is of the visible light map and the other half line is of the infrared map. Both maps are shown normally recorded side by side in FIG. 3, wherein the letter V represents the data of a visible light map, and the letter I, the infrared map.

It is desirable to select either the visible map portion V or the infrared portion I and expand it the full width of the recording paper P. If the visible light portion V were simply expanded laterally the record would be distorted as shown in FIG. 4. The distortion can be corrected and the correct aspect ratio restored if the paper feed rate is doubled as shown in FIG. 5. However, as previously mentioned, contrast, definition, legibility and reproducibility deteriorate with increased feed rate as shown in FIG. 5. This deterioration is corrected by repeat printing as described above.

When a switch with ganged sections S2a, S2b and S2c is thrown from its normal position N to expanding position EXP the following changes are made. Switch section S2a selects from the clock 4 a clock frequency double that is shown in Table I for the corresponding scan rate. As a result each received line of information will be read into the buffer storage 67 at twice the normal speed for the given scan rate. Consequently the line in the buffer storage 67 will be filled when only half the incoming line is received and stored. That half line (e.g. the visible light half V of FIG. 3) will, however, be read out at the normal standard scan rate of the recorder R and will therefore be expanded over the full width of the paper P as in FIGS. 4, 5 or 6.

The distortion of FIG. 4 is eliminated by simultaneous transfer of switch section S2b to EXP position which applies through the mixer to the decoder a signal selecting a paper feed rate twice that of FIG. 4 resulting in an undistorted recording as shown in FIG. 5.

To prevent the loss of contrast by the wide spacing of lines as shown in FIG. 5, the third switch section S2c applies an EXP signal to the repeat print circuit 23 previously described. A resulting signal to the buffer storage 67 causes each stored line to be read out to the recorder two times, once on each of two successive lines. As shown in FIG. 6 line density, contrast and readability are substantially enhanced by the repeat printing.

It should be understood that the present disclosure is for the purpose of illustration only and that this invention includes all modifications and equivalents which fall within the scope of the appended claims.

What is claimed is:

1. Apparatus for recording different kinds of transmitted electrical signals on a moving web of predetermined width, each signal comprising a plurality of lines of information and constituting a frame of graphic information including a distinct characteristic identifying a suitable aspect ratio of the frame, different kinds of signals comprising lines occurring at different line rates, the apparatus comprising:

means for receipt of the signals at their transmitted line rate and storage of the signals;
   means to read signals out of the storage means at a rate independent of the transmitted line rate;
   scan means coupled to the storage means and responsive to signals read out of the storage means to record successive lines on the web at a scan rate independent of the transmitted line rate;
   variable feed means for advancing the recording web relative to the scan means at one of a plurality of substantially different speeds; and
   means responsive to the transmitted signal for selecting the web feed speed dependent on the distinctive characteristic of the transmitted signal whereby signal groups of different line rates are recorded each in a suitable aspect ratio.

2. Apparatus according to claim 1 wherein the recording means has a constant scan rate.

3. Apparatus according to claim 1 including means responsive to signals of a line rate lower than the scan rate to cause readout of each stored line a plurality of times.

4. Apparatus according to claim 1 including means for manually selecting the web feed speed, and means for registering the manually selected speed and the speed selected by the frequency selective means.

5. Apparatus according to claim 1 including means for generating a plurality of web feed speed signals for application by the selecting means to the web feed means.

6. Apparatus according to claim 1 including means for choosing a portion of each transmitted signal line for storage, the readout means and web speed selecting means being responsive to the choosing means to increase the web speed.

7. Apparatus according to claim 1 including means to control the rate of signal storage during each line scan.

8. Apparatus according to claim 7 wherein the recording control means maintains the signal storage rate constant during each line scan.

9. Apparatus according to claim 7 wherein the controlling means includes countdown means reducing the line storage rate so as to allow storage of only a portion of a line during each scan.

10. Apparatus according to claim 9 including means coordinating the signal storage controlling means and the web feed speed selecting means so as to record a magnified portion of the graphic frame in suitable aspect ratio.

11. Apparatus according to claim 9 including means responsive to signals of a line rate lower than the scan rate to cause readout of each stored line a plurality of times.

12. Apparatus according to claim 1 wherein the characteristic is one of a plurality of frequencies and the selecting means includes frequency selective means.

13. Apparatus according to claim 12 wherein the frequency selective means has inputs for a plurality of frequencies and outputs corresponding to each input.

14. Apparatus according to claim 13 wherein the outputs carry a web feed speed selection signal corresponding to the input signal frequency.

15. Apparatus according to claim 12 including means for generating a plurality of web feed speed signals for applications by the selecting means to the web feed means.

16. Apparatus according to claim 13 including means for manually selecting the web feed speed, and means for registering the manually selected speed and the speed selected by the frequency selective means.

* * * * *